United States Patent [19]

Edwards

[11] Patent Number: 4,475,275

[45] Date of Patent: Oct. 9, 1984

[54] METHOD OF PRODUCING A FILLED CALENDER ROLL

[76] Inventor: William H. Edwards, Main St., Warner, N.H. 03278

[21] Appl. No.: 477,906

[22] Filed: Mar. 23, 1983

[51] Int. Cl.$^3$ ............................................. B21B 13/02
[52] U.S. Cl. ........................................ 29/110; 29/520; 29/DIG. 44; 29/124; 100/90
[58] Field of Search ................. 29/110, 132, 124, 515, 29/520, 129, 451, DIG. 44; 53/204, 409, 434; 100/90

[56] References Cited

U.S. PATENT DOCUMENTS

| Re. 13,128 | 7/1910 | Perkins | 29/124 |
|---|---|---|---|
| 1,956,843 | 5/1934 | Wheeler | 29/451 X |
| 2,225,870 | 12/1940 | Kämper | 100/90 X |
| 3,429,095 | 2/1969 | Huson | 100/90 X |
| 3,691,720 | 9/1972 | Anderson et al. | 29/DIG. 44 X |
| 4,035,982 | 7/1977 | Paules | 53/434 X |
| 4,184,825 | 1/1980 | Wolf | 100/90 X |
| 4,283,821 | 8/1981 | Paakkunainen | 29/129 |

Primary Examiner—Carl E. Hall
Assistant Examiner—John T. Burtch
Attorney, Agent, or Firm—Ross, Ross & Flavin

[57] ABSTRACT

A method for producing a filled calender roll comprising a load carrying shaft portion and having thereon a cover portion made of paper or cloth or the like. The cover portion is made by subjecting a great number of annular fiber material sheets fitted on the shaft portion to a very strong compression in the axial direction of the roll. The method includes the step of making the sheets oversized in diameter with respect to the diameter of the shaft portion so that there is initially, in the assembling program, a space at the interface of the shaft portion and the cover portion. After the axial compression of the fiber material and under the influence of a vacuum created at the interface, the sheets are caused to fill the void between the cover portion and the shaft portion.

4 Claims, 1 Drawing Figure

U.S. Patent    Oct. 9, 1984    4,475,275
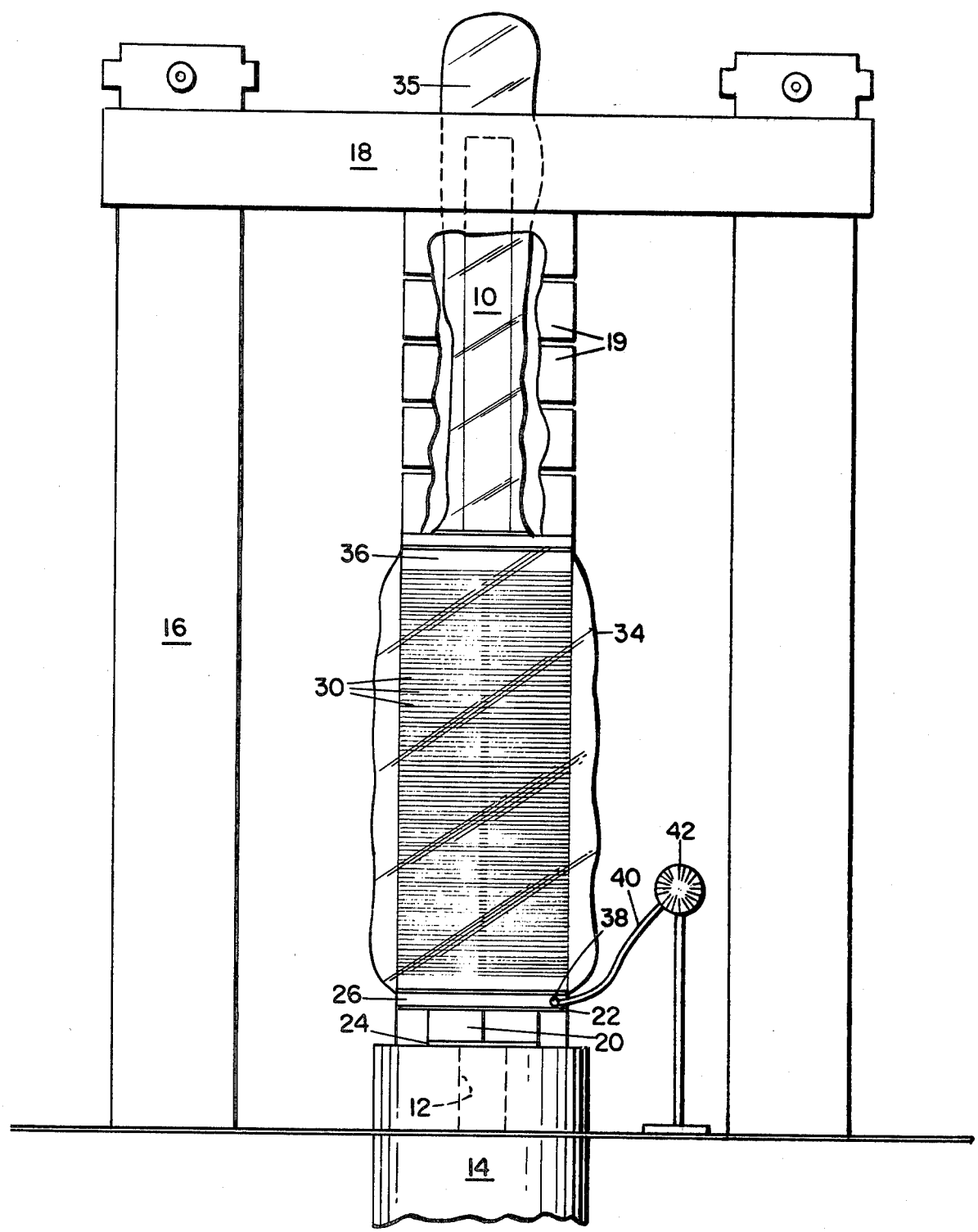

METHOD OF PRODUCING A FILLED CALENDER ROLL

The invention relates to a method of producing a so-called filled, roll such as used in calenders and super calenders and embossers in the papermaking industry, to the end of improving the quality of the roll by the forming of an essentially solid body.

In the manufacture of filled rolls, a steel shaft is placed in a vertical position in a high-pressure hydraulic press. A steel head or washer is locked on the lower end of the shaft. Holes of the same diameters as the steel shaft are then die-cut in the centers of the fillings and the fillings are then placed in seriatim over the top of and onto the shaft in stacked relationship. Pressure is applied and when sufficient filling has been placed on the shaft to provide the proper density and roll face, the top end is locked as by another steel head or washer and the roll surface is machined.

The fillings may consist of paper made of cotton or wool or the like.

The actual dimensions of the calender roll are determined by the type of calender stack in which it is to be employed, the type of finish which is to be applied to the paper being processed in the stack, and the dimensions of the paper being finished in the stack. Accordingly, the outer diameter of the working surface may range from approximately 6 to 34 inches and may have an effective length ranging between 45 and 350 inches, for example. The bore dimension of the fillings normally will be such as to provide an interference fit with the outer diameter dimension of the core element which will be determined by the size of the finished calender roll and the use to which it is to be put. By way of more specific example, a filled calender roll having a length on the order of 72 inches and an outer diameter on the order of 13½ inches may have a bore of about 7 inches in diameter.

Calender rolls of this type normally are used as "soft" rolls for calendering various sheet materials, e.g. paper, to high surface finish. Such a calender will comprise several rolls, soft as well as hard, the latter usually of chilled iron, arranged to form press nips constituted by one soft roll and one hard roll, it being desirable, in order to obtain a calendering effect which will give a material being calendered a high surface finish, to create a high nip pressure between a soft roll and a hard roll. However, the magnitude of high pressure in the nip is limited in previously known calenders for various reasons.

A soft roll provides a low per unit area pressure (over-all pressure) in the nip in proportion to the force per unit of dimension (linear pressure) between the soft roll and a hard roll, and therefore, if the use of a softer roll is desired and at the same time a given overall pressure in the nip is to be established, the linear pressure between the soft roll and the hard roll must be increased. The increased linear pressure and the lower resistance of the soft roll to deformation combined to produce greater deformation of the soft roll and a consequent generation of heat in the soft roll, caused by the deformation work of the material. Inasmuch as the deformation work and resulting generation of heat take place not only at the surface of the soft filled roll but also to a degree in the interior portions and inasmuch as the heat emission from the filled roll essentially occurs only from its cylindrical surface, mainly through heat absorption and conduction away by the web being calendered, a substantial rise in temperature will occur in the filled roll just beneath its surface, particularly when the material in the discs used in the filled roll structure has a relatively low heat conductivity.

To obtain a high production rate, the calender rolls must be run at a high peripheral speed. However, a high roll speed will also contribute to a greater deformation work per unit of time and a greater generation of heat in the material of the soft roll.

The tendency for soft filled rolls to be destroyed by the generation of heat in the filling material acts as a definite limit on both the maximum overall nip pressure and the maximum roll speed in a calender. Moreover, the rolls known heretofore suffer from the futher disadvantage of having a surface which is damaged or destroyed mechanically rather easily, which makes it necessary to regrind them or to provide them with new filling material after only relatively short service time.

The method of roll construction defined herein is aimed to provide a method for improving the fit of the filling to the steel shaft or cone. By evacuating the air from therebetween, we advantageously provide a condition of minimal lockup pressure if any at all so as to minimize the chance of roll blowup or explosion.

A significant safety factor is achieved in that as air is being evacuated from between the piles of filling material there is created less of a spring-back condition.

In the development of the invention, various tests were performed on columns of fillings, i.e. doughnut-shaped pieces of paper, which were pressed to a usable density in the effort to determine what happens to paper under the generated stresses. It was found that all paper grades stretched an equal amount in all directions under this pressure. Some grades recovered almost completely when pressure was released and other grades recovered only a small amount. It was determined that all grades stretched inwardly on the I.D. of the paper fillings, a stretching which was found to be the same regardless of the I.D. dimension.

When these same fillings are sleeved upon a mandrel and pressed, the grades that did not recover when pressure was released had expanded their I.D., suggesting that paper, when pressed by itself, expands equally in all directions but when pressed upon a mandrel, it seems to stretch away from the mandrel leading to the eventually provable conclusion that there was an entrapment and compression of air within the forming structure as it was being filled and the theory that the alleviation of the air problem at the mandrel or shaft by the establishment of a vacuum condition during roll filling would ameliorate the offending condition.

The invention will be more fully described in connection with the attached drawing in which:

The FIGURE is a view in side elevation of a roll in the process of being formed, with certain parts broken away for purposes of clarity.

In the drawing, 10 indicates the shaft portion of the roll being formed, the lower end of which shaft being nestably received in a provided opening 12 in the top of an upwardly projecting piston 14 which will be understood to be driven upwardly by means not shown so as to effect a pressing action against the constraints of the uprights 16 and cross arms 18 and blocks 19 of a conventional press. Being conventional, same is not described in greater detail.

A nut 20 is threadedly engaged on the lower end of shaft 10, on opposite sides of which inboard and outboard seals 22 and 24 respectively are sleeved over the shaft end and upwardly of the nut and inboard seal, a bottom ring 26 is next sleeved upon the shaft.

With this assembly in situ, the fillings 30 are then sleeved upon the shaft in small increments.

A top retaining ring 36 is then sleeved upon the shaft so as to be seated upon the top of the stack and pressure is exerted upon the stack before another increment of fillings is added to the stack as the building process ensues.

It is to be understood that the fillings or "doughnuts" are preliminarily prepared such that the I.D. of each is intentionally died out so as to be oversized with reference to the shaft diameter so as to accommodate to the recognized inward stretch thereof under the forces of pressure and in the absence of air.

For optimum results an oversize of at least 0.030" and no more than 0.125" has been determined to be requisite.

The fillings are stacked upon the shaft so as to extend to almost the entirety of the shaft length.

To attain a vacuum condition adjacent the shaft, a pair of flexible plastic sleeves are employed, one with a diameter slightly in excess of the diameter of the finished O.D. of the roll and equal in length to the anticipated final overall roll length, the other with a diameter slightly in excess of the shaft diameter. These were for the purpose of sealing off the shaft and filling area during the roll construction.

With the stacking taking place, an outer plastic sleeve 34 is pulled upwardly, being engaged with the bottom and top rings 26 and 36 in airtight relationship as by tight outer retaining bands (not shown).

Another inner plastic sleeve 35 is secured by the tight outer retaining band embracing the top ring 36 and is tightly sleeved about the shaft 10 near the top extremity thereof all to the end that air in the area within the pair of cooperating plastic sleeves may be evacuated so as to produce a vacuum condition.

A hole, drilled through lower retaining ring 26 from O.D. to I.D., accepts a fitting 38 for the insertion of a suction line 40 thereupon connected to a suitable compressor (not shown) wherewith a vacuum is drawn from the space between the shaft and the stack, same being measured by a vacuum pump guage 42.

After sealing, a vacuum pump (not shown) is energized and a vacuum is drawn.

In a matter of a few minutes, the plastic sleeve is drawn tightly against the outer roll periphery.

The press is then actuated and the stack is slowly pressed relative to the shaft.

The desideratum is that the buildup of pressure be slow or gradual so as to allow the vacuum pump to accomplish its evacuating function.

When and if the sleeve appears to loosen with respect to the O.D. of the stack, the sleeve can and should be rearranged so as to be held taut against the stack.

The buildup of the stack is continued by the utilization of a metal sleeve having a diameter equal to the shaft diameter so as to facilitate the threading of additional increments of fillings at the top of the stack.

When the shaft is believed to have the desired number of pounds for the desired density, it may be desirable to screw the top nut downwardly upon the top of the stack.

The pressure may then be gradually released while allowing the locking nut to take over the pressured load.

One of the obvious advantages attained by making a roll according to the recited method is the uniform hardness as measured by a Durometer.

The embodiments of the invention in which an exclusive property or privilege is claimed are defined as follows:

1. A method for producing a filled roll consisting of a load carrying shaft portion with a cover portion comprised of a stack of oversized annular fillings sleeved upon the shaft portion and including the steps of:
   subjecting the stack of fillings fitted on the shaft to a strong compression in the axial direction of the roll while the shaft and stack are enclosed within a sealed area by means of sleeving, evacuating the air from within the enclosed area for allowing the fillings to stretch toward the shaft and to fill the cavity therebetween.

2. In a method for producing a filled roll consisting of a load carrying shaft having a stack of oversized annular fillings sleeved thereupon and including the steps of:
   subjecting the stack of fillings fitted on the shaft to a compression in the axial direction of the roll while the shaft and stack are sealingly enclosed within an airtight sleeve, evacuating the air from within the enclosure and particularly in the area of the interface of shaft and stack for allowing the stretching of the fillings toward the shaft and a filling of the cavity therebetween.

3. A method for producing a filled roll comprising a load carrying shaft portion and thereon a cover portion made of a stack of fillings of fiber material, the cover portion being made by strong compression to extend in an axial direction of the roll toward the shaft portion, said method including the steps of forming the fillings with an oversized I.D. so as to define a cavity at the interface of the shaft portion and the cover portion, and evacuating air during said axial compression of the filling while forcing the filling to fill the cavity between said shaft portion and said cover portion under the forces of the compression in the absence of air.

4. In a method of producing a filled roll comprising a load carrying shaft and a stack of fibrous fillings sleeved thereon, the stack being made by compression to extend in an axial direction of the roll toward the shaft, the method including the steps of forming the fillings with an oversized I.D. so as to define a cavity at the interface of the shaft and stack, and evacuating air during the axial compression forcing the fillings of the stack to fill the cavity between the shaft and stack under the forces of the compression and in the absence of air.

* * * * *